US009400840B2

(12) United States Patent
Palmert

(10) Patent No.: US 9,400,840 B2
(45) Date of Patent: Jul. 26, 2016

(54) COMBINING TOPIC SUGGESTIONS FROM DIFFERENT TOPIC SOURCES TO ASSIGN TO TEXTUAL DATA ITEMS

(71) Applicant: salesforce.com, inc., San Francisco, CA (US)

(72) Inventor: Joel Palmert, Stockholm (SE)

(73) Assignee: salesforce.com, inc., San Francisco, CA (US)

(\*) Notice: Subject to any disclaimer, the term of this patent is extended or adjusted under 35 U.S.C. 154(b) by 290 days.

(21) Appl. No.: 14/221,971

(22) Filed: Mar. 21, 2014

(65) Prior Publication Data

US 2014/0289231 A1  Sep. 25, 2014

Related U.S. Application Data

(60) Provisional application No. 61/804,945, filed on Mar. 25, 2013.

(51) Int. Cl.
*G06F 7/00* (2006.01)
*G06F 17/30* (2006.01)

(52) U.S. Cl.
CPC ................................. *G06F 17/30719* (2013.01)

(58) Field of Classification Search
CPC .......... G06F 17/3082; G06F 17/30867; G06F 3/0482
USPC ...................................................... 707/723
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |

(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

*Primary Examiner* — Binh V Ho
(74) *Attorney, Agent, or Firm* — Weaver Austin Villeneuve & Sampson LLP

(57) ABSTRACT

Disclosed are systems, apparatus, methods and computer-readable storage media for combining topic suggestions from different topic sources to assign to textual data items. In some implementations, a first automated topic source provides one or more first topic suggestions to associate with a textual data item. Each first topic suggestion has a respective first characteristic, which can be adjusted. A second automated topic source provides one or more second topic suggestions to associate with the textual data item. Each second topic suggestion has a respective second characteristic, which can be adjusted. The first and second topic suggestions are combined to define a combined list. A reference value is determined or retrieved to impact ordering of the topic suggestions in the combined list.

20 Claims, 11 Drawing Sheets

(56) References Cited

U.S. PATENT DOCUMENTS

| | | |
|---|---|---|
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Assal et al. |
| 7,945,653 B2 | 5/2011 | Zuckerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,204,897 B1 * | 6/2012 | Djabarov .......... G06F 17/30705 707/767 |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,075,766 B2 | 7/2015 | Palmert |
| 9,292,589 B2 | 3/2016 | Palmert et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |

(56) References Cited

U.S. PATENT DOCUMENTS

| | | |
|---|---|---|
| 2008/0249786 A1* | 10/2008 | Oldham ............ G06Q 30/02 705/1.1 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177728 A1* | 7/2009 | Pottenger ............ G06Q 50/188 709/201 |
| 2009/0177744 A1 | 7/2009 | Marlow et al. |
| 2011/0087681 A1* | 4/2011 | Bhammar ......... G06F 17/30489 707/752 |
| 2011/0106746 A1* | 5/2011 | Ventilla .............. G06Q 10/10 706/50 |
| 2011/0218958 A1 | 9/2011 | Warshavsky et al. |
| 2011/0247051 A1 | 10/2011 | Bulumulla et al. |
| 2011/0302216 A1* | 12/2011 | D'Angelo ............ G06Q 10/01 707/802 |
| 2012/0042218 A1 | 2/2012 | Cinarkaya et al. |
| 2012/0143911 A1* | 6/2012 | Liebald ............ G06F 17/30702 707/771 |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0067814 A1* | 3/2014 | Palmert ............ G06F 17/30598 707/738 |
| 2014/0207506 A1 | 7/2014 | Palmert et al. |
| 2014/0207777 A1 | 7/2014 | Palmert et al. |
| 2014/0207801 A1 | 7/2014 | Palmert et al. |
| 2014/0359537 A1 | 12/2014 | Jackobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |
| 2015/0262069 A1* | 9/2015 | Gabriel ............ G06F 17/30867 706/48 |

* cited by examiner

*FIGURE 5*

| Topic ID 804 | Information Update IDs 808 |
|---|---|
| T331 | P522 |
| T332 | C123 |
| T333 | FC140 |

⋮

Topic Table 800

FIGURE 8

COMBINING TOPIC SUGGESTIONS FROM DIFFERENT TOPIC SOURCES TO ASSIGN TO TEXTUAL DATA ITEMS

PRIORITY DATA

This patent document claims priority to commonly assigned U.S. Provisional Patent Application No. 61/804,945, titled "System and Method for Suggesting Topics for Posting in a Social Network", by Joel Palmert, filed on Mar. 25, 2013, which is hereby incorporated by reference in its entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This patent document generally relates to assigning topics to textual data and content, for example, stored in a database system. More specifically, this patent document discloses techniques for combining topic suggestions from more than one topic source as candidates to be assigned to textual data items.

BACKGROUND

"Cloud computing" services provide shared resources, applications, and information to computers and other devices upon request. In cloud computing environments, services can be provided by one or more servers accessible over the Internet rather than installing software locally on in-house computer systems. Technological details can be abstracted from the users who no longer have need for expertise in, or control over, the technology infrastructure "in the cloud" that supports them. By way of example, social networking services can be provided in a cloud computing context.

BRIEF DESCRIPTION OF THE DRAWINGS

The included drawings are for illustrative purposes and serve only to provide examples of possible structures and operations for the disclosed inventive systems, apparatus, methods and computer-readable storage media for combining topic suggestions from different topic sources to assign to textual data items. These drawings in no way limit any changes in form and detail that may be made by one skilled in the art without departing from the spirit and scope of the disclosed implementations.

FIG. 5 shows an example of a presentation 500 of a group feed page in the form of a GUI as displayed on a user's computing device for assigning topics from a combined list to feed items of a group feed, in accordance with some implementations.

FIG. 8 shows an example of a topic table 800 for tracking information updates and topic associations in a social networking system, in accordance with some implementations.

DETAILED DESCRIPTION

Figure 1:
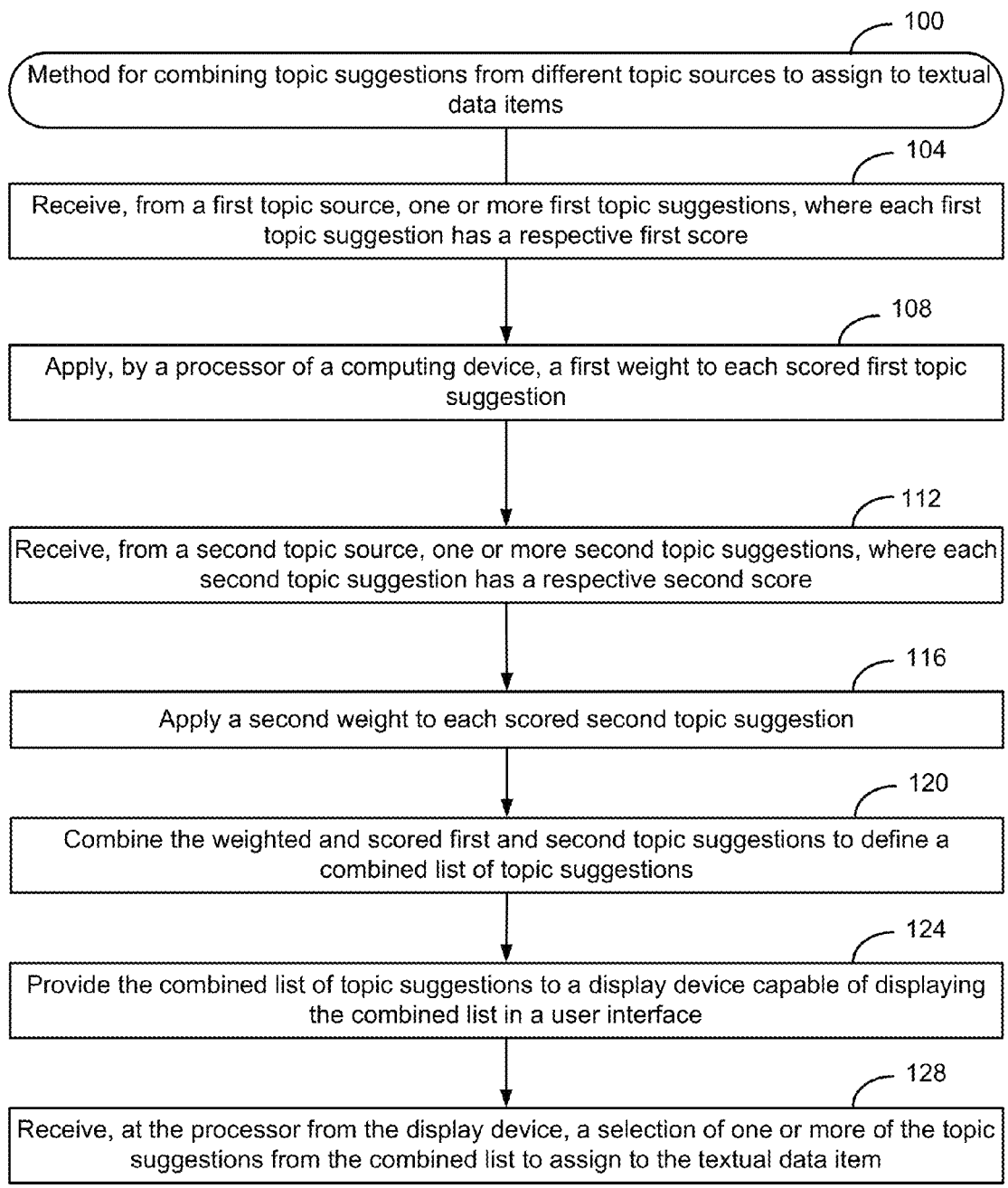
FIG. 1 shows a flowchart of an example of a computer implemented method 100 for combining topic suggestions from different topic sources to assign to textual data items, performed in accordance with some implementations.

Examples of systems, apparatus, methods and computer-readable storage media according to the disclosed implementations are described in this section. These examples are being provided solely to add context and aid in the understanding of the disclosed implementations. It will thus be apparent to one skilled in the art that implementations may be practiced without some or all of these specific details. In other instances, certain process/method operations also referred to herein as "blocks," have not been described in detail in order to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the blocks of methods shown and described herein are not necessarily performed in the order indicated. It should also be understood that the methods may include more or fewer blocks than are indicated. In some implementations, blocks described herein as separate blocks may be combined. Conversely, what may be described herein as a single block may be implemented in multiple blocks.

Some implementations of the disclosed systems, apparatus, methods, and computer-readable storage media are configured to determine relevant and useful topics to suggest and be associated with textual data, for instance, using a database system. Some of the disclosed implementations can be practiced to leverage and manage various topic sources to identify more relevant topic suggestions to assign to input textual data. For example, any number of topic sources can be implemented to separately digest the same textual data and generate respective sets of scored topic suggestions as candidates to apply to words and/or phrases in the text. Some of the disclosed implementations can be practiced to apply weights to the scores, where each weight is associated with a respective topic source. For instance, the weighted scores can be used to rank the topic suggestions from the various sources and combine the topic suggestions in a list to present in a user interface on a display device such as a smartphone or tablet. A user or automated process can then select one or more topics from the list to apply to the input textual data.

In some implementations, an initial or previous weight assigned to a given topic source can be adjusted in response to the selection of topic suggestions in the combined list from that source. Thus, in some examples, as additional input text is provided to the different sources and selections are made over time, the weights can be monitored and further adjusted to converge towards optimal values. Thus, over successive iterations, higher relative weights can be assigned to more successful topic sources to leverage their success rate and thus present more relevant and helpful topic suggestions in a combined list. To this end, some of the disclosed implementations provide a recursive process in which weights are optimized over computational intervals to identify and reward certain topic sources when topic suggestions from those sources are assigned to input text.

Various cloud-based services and software can be implemented to generate topic suggestions for input text using different techniques. Some topic sources in some implementations can be configured to perform a semantic analysis of input text to identify words and phrases that carry meaning. For example, topic suggestion engines commonly used in knowledge base software and cloud-based services can serve as topic sources. In another example, a topic source implemented using hashtags is provided by a social networking system such as Chatter® or Facebook®. Another example of a topic source that can be used with the disclosed techniques is a question-and-answer (Q&A) portal hosted on a web site accessible via the Internet.

One example of a topic source implemented using the disclosed techniques is a topic index, for instance, in the form of a social networking topic index maintained in response to user assignments of topics to indexed words appearing in feed items such as posts and comments. For instance, a social networking topic index can be configured to analyze each word in a feed item published to a social network feed and identify topics from the index that previously were assigned to those words. That is, topics in the topic index are maintained and updated as users select topics for the same words appearing in different feed items.

Other examples of topic sources which can be used in some implementations include natural language processing (NLP) libraries. Such libraries can be managed by or maintained on behalf of third parties, that is, parties other than a party providing the disclosed techniques for weighting and adjusting the weights assigned to various topic sources. In some implementations, the same party is responsible for managing the topic sources and assigning and adjusting weights. Various types of NLP libraries can be used, including those configured to identify named entities in text such as the name of a person or the name of an organization and suggest those names as topics. Another example of an NLP library is configured to tag parts of speech. For instance, a noun can be given a higher score, or otherwise identified as a stronger topic suggestion, than a verb. In general, some topic sources can be configured to score topic suggestions based on the types of words and phrases identified, such as: ADJECTIVE, NOUN, PUNCTUATION, STOPWORD, URL, VERB, ARTICLE, PRONOUN, CONJUNCTION, FOREIGN, PREPOSITION, PERSON, ORGANIZATION, LOCATION, RELIGION, NATIONALITY, TITLE, etc.

Still further examples of topic sources which can be used in some implementations include: consecutive words identifiers, for instance, configured to identify words with initial caps or all caps and suggest those words as topics; noun phrase extractors configured to identify and suggest any consecutive two or more nouns in the text or any adjective followed by one or more nouns; use-based word identifiers configured to identify words most recently used by a user and/or words more frequently used; and other available topic sources known to those skilled in the art.

The disclosed techniques have wide applicability to various types of textual content, which can be provided as input data to the various topic sources and tagged with topic suggestions selected by a user. The textual data can be included in, attached to, or linked with any of various entities including but not limited to social network feed items, documents, knowledge articles, scientific papers, books, database records, web pages, online encyclopedia entries, user profiles, user accounts, email messages, text messages, instant messages (IM), and customer relationship management (CRM) objects.

Some but not all of the techniques described or referenced herein are implemented to combine and suggest topics to be applied to data appearing in a social network feed. Social networking systems have become a popular way to facilitate communication among people, any of whom can be recognized as users of a social networking system. One example of a social networking system is Chatter®, provided by salesforce.com, inc. of San Francisco, Calif. salesforce.com, inc. is a provider of social networking services, CRM services and other database management services, any of which can be accessed and used in conjunction with the techniques disclosed herein in some implementations. These various services can be provided in a cloud computing environment, for example, in the context of a multi-tenant database system. Thus, the disclosed techniques can be implemented without having to install software locally, that is, on computing devices of users interacting with services available through the cloud. While the disclosed implementations are often described with reference to Chatter®, those skilled in the art should understand that the disclosed techniques are neither limited to Chatter® nor to any other services and systems provided by salesforce.com, inc. and can be implemented in the context of various other database systems and/or social networking systems such as Facebook®, LinkedIn®, Twitter®, Google+®, Yammer® and Jive® by way of example only.

Some social networking systems can be implemented in various settings, including organizations. For instance, a social networking system can be implemented to connect users within an enterprise such as a company or business partnership, or a group of users within such an organization. For instance, Chatter® can be used by employee users in a division of a business organization to share data, communicate, and collaborate with each other for various social purposes often involving the business of the organization. In the example of a multi-tenant database system, each organization or group within the organization can be a respective tenant of the system, as described in greater detail below.

In some social networking systems, users can access one or more social network feeds, which include information updates presented as items or entries in the feed. Such a feed item can include a single information update or a collection of individual information updates. A feed item can include various types of data including character-based data, audio data, image data and/or video data. A social network feed can be displayed in a graphical user interface (GUI) on a display device such as the display of a computing device as described below. The information updates can include various social network data from various sources and can be stored in an on-demand database service environment. In some implementations, the disclosed methods, apparatus, systems, and computer-readable storage media may be configured or designed for use in a multi-tenant database environment.

In some implementations, a social networking system may allow a user to follow data objects in the form of records such as cases, accounts, or opportunities, in addition to following individual users and groups of users. The "following" of a record stored in a database, as described in greater detail below, allows a user to track the progress of that record when the user is subscribed to the record. Updates to the record, also referred to herein as changes to the record, are one type of information update that can occur and be noted on a social network feed such as a record feed or a news feed of a user subscribed to the record. Examples of record updates include field changes in the record, updates to the status of a record, as well as the creation of the record itself. Some records are publicly accessible, such that any user can follow the record, while other records are private, for which appropriate security clearance/permissions are a prerequisite to a user following the record.

Information updates can include various types of updates, which may or may not be linked with a particular record. For example, information updates can be user-submitted messages or can otherwise be generated in response to user actions or in response to events. Examples of messages include: posts, comments, indications of a user's personal preferences such as "likes" and "dislikes", updates to a user's status, uploaded files, and user-submitted hyperlinks to social network data or other network data such as various documents and/or web pages on the Internet. Posts can include alpha-numeric or other character-based user inputs such as words, phrases, statements, questions, emotional expressions, and/or symbols. Comments generally refer to responses to posts or to other information updates, such as words, phrases, statements, answers, questions, and reactionary emotional expressions and/or symbols. Multimedia data can be included in, linked with, or attached to a post or comment. For example, a post can include textual statements in combination with a JPEG image or animated image. A like or dislike can be submitted in response to a particular post or comment. Examples of uploaded files include presentations, documents, multimedia files, and the like.

Users can follow a record by subscribing to the record, as mentioned above. Users can also follow other entities such as other types of data objects, other users, and groups of users. Feed tracked updates regarding such entities are one type of information update that can be received and included in the user's news feed. Any number of users can follow a particular entity and thus view information updates pertaining to that entity on the users' respective news feeds. In some social networks, users may follow each other by establishing connections with each other, sometimes referred to as "friending" one another. By establishing such a connection, one user may be able to see information generated by, generated about, or otherwise associated with another user. For instance, a first user may be able to see information posted by a second user to the second user's personal social network page. One implementation of such a personal social network page is a user's profile page, for example, in the form of a web page representing the user's profile. In one example, when the first user is following the second user, the first user's news feed can receive a post from the second user submitted to the second user's profile feed. A user's profile feed is also referred to herein as the user's "wall," which is one example of a social network feed displayed on the user's profile page.

In some implementations, a social network feed may be specific to a group of users of a social networking system. For instance, a group of users may publish a news feed. Members of the group may view and post to this group feed in accordance with a permissions configuration for the feed and the group. Information updates in a group context can also include changes to group status information.

In some implementations, when data such as posts or comments input from one or more users are submitted to a social network feed for a particular user, group, object, or other construct within a social networking system, an email notification or other type of network communication may be transmitted to all users following the user, group, or object in addition to the inclusion of the data as a feed item in one or more feeds, such as a user's profile feed, a news feed, or a record feed. In some social networking systems, the occurrence of such a notification is limited to the first instance of a published input, which may form part of a larger conversation. For instance, a notification may be transmitted for an initial post, but not for comments on the post. In some other implementations, a separate notification is transmitted for each such information update.

The term "multi-tenant database system" generally refers to those systems in which various elements of hardware and/or software of a database system may be shared by one or more customers. For example, a given application server may simultaneously process requests for a great number of customers, and a given database table may store rows of data such as feed items for a potentially much greater number of customers.

An example of a "user profile" or "user's profile" is a database object or set of objects configured to store and maintain data about a given user of a social networking system and/or database system. The data can include general information, such as name, title, phone number, a photo, a biographical summary, and a status, e.g., text describing what the user is currently doing. As mentioned below, the data can include messages created by other users. Where there are multiple tenants, a user is typically associated with a particular tenant. For example, a user could be a salesperson of a company, which is a tenant of the database system that provides a database service.

The term "record" generally refers to a data entity having fields with values and stored in database system. An example of a record is an instance of a data object created by a user of the database service, for example, in the form of a CRM record about a particular (actual or potential) business relationship or project. The record can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

The terms "social network feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) generally refers to an item of information, which can be presented in the feed such as a post submitted by a user. Feed items of information about a user can be presented in a user's profile feed of the database, while feed items of information about a record can be presented in a record feed in the database, by way of example. A profile feed and a record feed are examples of different types of social network feeds. A second user following a first user and a record can receive the feed items associated with the first user and the record for display in the second user's news feed, which is another type of social network feed. In some implementations, the feed items from any number of followed users and records can be combined into a single social network feed of a particular user.

As examples, a feed item can be a message, such as a user-generated post of text data, and a feed tracked update to a record or profile, such as a change to a field of the record. Feed tracked updates are described in greater detail below. A feed can be a combination of messages and feed tracked updates. Messages include text created by a user, and may include other data as well. Examples of messages include posts, user status updates, and comments. Messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a GUI, for instance, on the user's profile page, as part of the user's profile feed. In contrast to a post, a user status update changes a status of a user and can be made by that user or an administrator. A record can also have a status, the update of which can be provided by an owner of the record or other users having suitable write access permissions to the record. The owner can be a single user, multiple users, or a group.

In some implementations, a comment can be made on any feed item. In some implementations, comments are organized as a list explicitly tied to a particular feed tracked update, post, or status update. In some implementations, comments may not be listed in the first layer (in a hierarchal sense) of feed items, but listed as a second layer branching from a particular first layer feed item.

A "feed tracked update," also referred to herein as a "feed update," is one type of information update and generally refers to data representing an event. A feed tracked update can include text generated by the database system in response to the event, to be provided as one or more feed items for possible inclusion in one or more feeds. In one implementation, the data can initially be stored, and then the database system can later use the data to create text for describing the event. Both the data and/or the text can be a feed tracked update, as used herein. In various implementations, an event can be an update of a record and/or can be triggered by a specific action by a user. Which actions trigger an event can be configurable. Which events have feed tracked updates created and which feed updates are sent to which users can also be configurable. Messages and feed updates can be stored as a field or child object of the record. For example, the feed can be stored as a child object of the record.

A "group" is generally a collection of users. In some implementations, the group may be defined as users with a same or similar attribute, or by membership. In some implementations, a "group feed", also referred to herein as a "group news feed", includes one or more feed items about any user in the group. In some implementations, the group feed also includes information updates and other feed items that are about the group as a whole, the group's purpose, the group's description, and group records and other objects stored in association with the group. Threads of information updates including group record updates and messages, such as posts, comments, likes, etc., can define group conversations and change over time.

An "entity feed" or "record feed" generally refers to a feed of feed items about a particular record in the database. Such feed items can include feed tracked updates about changes to the record and posts made by users about the record. An entity feed can be composed of any type of feed item. Such a feed can be displayed on a page such as a web page associated with the record, e.g., a home page of the record. As used herein, a "profile feed" or "user's profile feed" generally refers to a feed of feed items about a particular user. In one example, the feed items for a profile feed include posts and comments that other users make about or send to the particular user, and status updates made by the particular user. Such a profile feed can be displayed on a page associated with the particular user. In another example, feed items in a profile feed could include posts made by the particular user and feed tracked updates initiated based on actions of the particular user.

FIG. 1 shows a flowchart of an example of a computer implemented method 100 for combining topic suggestions from different topic sources to assign to textual data items, performed in accordance with some implementations. FIG. 1 is described with reference to FIG. 3, which shows an example of a system 300 for combining topic suggestions, in accordance with some implementations.

Figure 3:
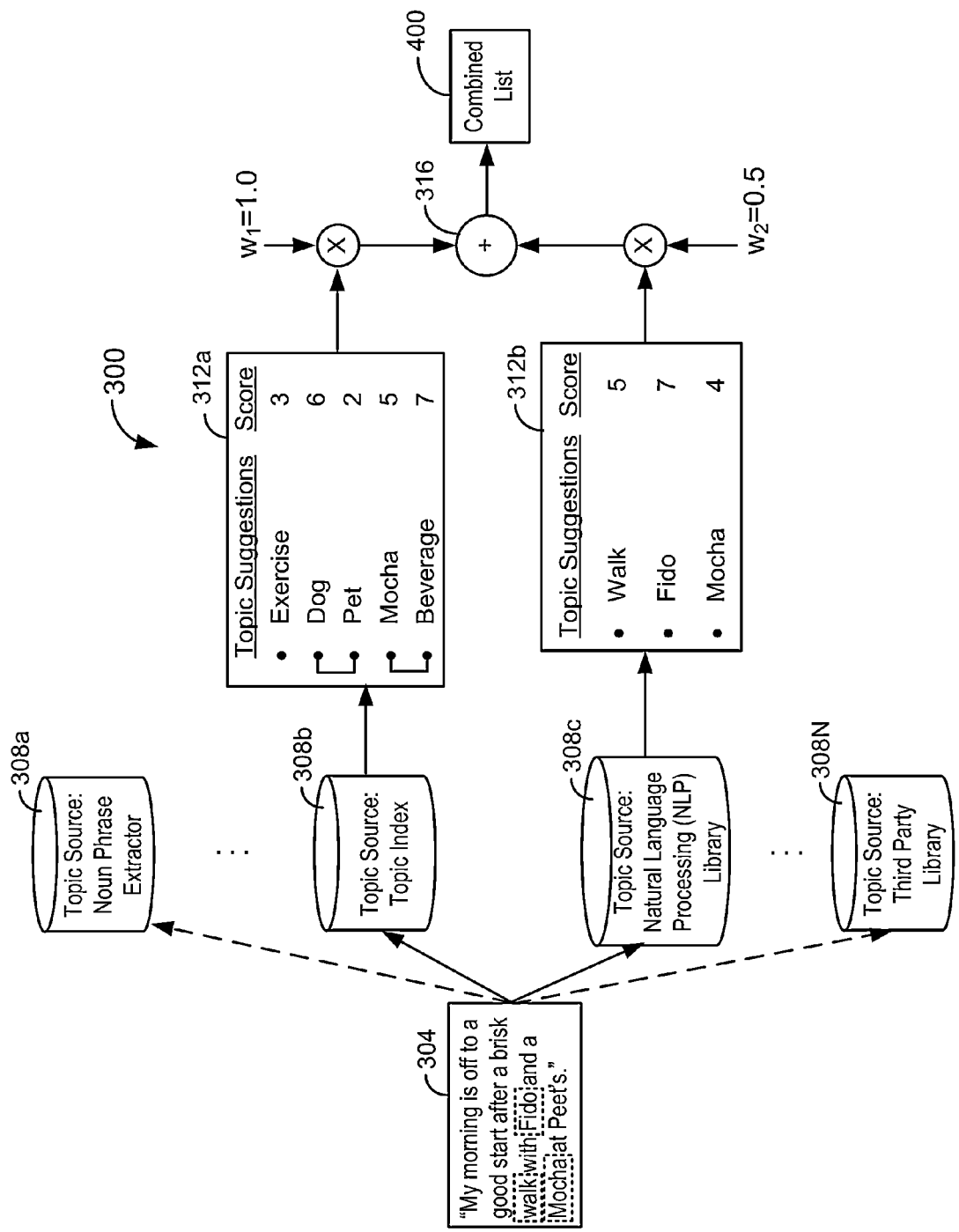
FIG. 3 shows an example of a system 300 for combining topic suggestions from different topic sources to assign to textual data items, in accordance with some implementations.

In the system of FIG. 3, a textual data item in the form of a post 304 published to a social network feed is provided as an input to a variety of topic sources 308a-308N. Any number of different topic sources can be used. In the example of FIG. 3, topic sources of several different types are provided. These include a noun phrase extractor 308a, a topic index 308b and a Natural Language Processing (NLP) library 308c. One or more of the topic sources 308a-308c can be provided by a party implementing and/or maintaining system 300 of FIG. 3. In some instances, one or more topic sources are provided by a different party than the party implementing system 300, such as the example of third party library 308N. While not illustrated, other various types of topic sources can be used, such as a consecutive words identifier, a most-recently-used topics identifier, and a most-frequently-used topics identifier.

In FIG. 3, those skilled in the art should appreciate that post 304 is one example of a textual data item including textual content that can be processed using the disclosed techniques. Other examples of textual data items include other types of social networking messages such as comments and status updates, as well as database records, record updates, documents, knowledge articles, CRM objects, instant messages, text messages and any other data or object containing textual data and capable of being transmitted and/or stored in a database system. In the example of post 304, the textual content of the post includes: "My morning is off to a good start after a brisk walk with Fido and a Mocha at Peet's." Any combination of words and letters can serve as the content of a given textual data item. Thus, any textual data item processed according to the disclosed techniques can include a letter, a combination of letters, a word, a combination of words, a phrase, a sentence, a combination of sentence, etc.

While any number of topic sources 308a-308N can be used, for purposes of illustration, the example of FIG. 3 is described using topic sources 308b and 308c. It should be understood that any number of additional topic sources can process a textual data item such as post 304 to generate respective sets of topic suggestions to be combined as further explained below. It is also noted that the architecture of the example of FIG. 3 facilitates distributing the computations of the various topic sources to different machines. For instance, topic source 308b can be implemented using one or more of a first bank of servers maintained by a first organization, topic source 308c can be implemented using one or more of a second bank of servers maintained by the first organization or a different second organization, and so forth. When processing is distributed in such a manner, the computing power of several processors of different computing devices can be leveraged at the same time rather processing outputs from the different devices in sequence.

Returning to FIG. 1, at block 104, topic index 308b processes post 304 to generate a list of topic suggestions 312a. In this example, topic index 308b has identified keywords "walk", "Fido" and "Mocha" in post 304 as items of textual content for which to suggest topics. In this example, based on prior experience, topic index 308b has been trained to determine that the topic "exercise" is possibly related to the word "walk", since one or more users has previously assigned the topic "exercise" to posts and/or other textual data items containing words such as "walk". By the same token, topic index 308b has suggested the topics of "dog" and "pet" to the keyword "Fido". Similarly, topic index 308b has suggested topics "Mocha" and "beverage" to keyword "Mocha" in post 304. Those skilled in the art should appreciate that topic index 308b includes suitable hardware, software and/or firmware to process any letter, word, or combination of words in post 304 in similar fashion to suggest topics previously used and identified in a topic index. The various suggested topics from topic index 308b are provided in list 312a as shown in FIG. 3.

In FIG. 3, a different list of suggested topics 312b is provided by NLP library 308c in response to post 304. The topics suggested in list 312b are different from those in list 312a in this example, because NLP library 308c has a processing engine configured to perform a semantic and statistical analysis on the content of post 304. In this example, the analysis does not include any consideration of how other users have selected and assigned topics, in contrast with topic index 308b. Thus, in this example, NLP library 308c is only configured to suggest keywords in post 304 as topics. Thus, NLP library 308c has suggested topic "walk" in relation to keyword "walk", topic "Fido" in relation to keyword "Fido", and topic "Mocha" in relation to keyword "Mocha", as shown in list 312b.

At block 104 of FIG. 1, each topic in a list 312a or 312b has a score assigned by the topic source generating the list. A score is one example of a characteristic of a topic. For example, in list 312a, the suggested topic "exercise" has a score of 3, "dog" has a score of 6, "pet" has a score of 2 and so forth. NLP library 308c has assigned the scores 5, 7 and 4 to respective topic suggestions "walk", "Fido" and "Mocha". The score for a given topic suggestion generally indicates how strong of a likelihood the given source has determined that the topic suggestion will be selected and applied to a keyword or textual data item containing the keyword. For example, NLP library 308c may be configured to return a relatively high score for a word identified as a noun such as a name of an organization as opposed to a relatively low score returned for a verb.

In FIG. 3, topic index 308b is configured to assign scores to suggested topics according to how often other users have used the same keywords in a textual data item or a subset of the same keywords with a suggested topic. NLP library 308c is configured to assign scores according to how often a given keyword in an input textual data item is classified. In this example, NLP library 308c assigns the name of an organization a relatively higher score than other nouns such as "Mocha". Also, those skilled in the art should appreciate that NLP library 308c can be implemented to include many different NLP libraries, the topic suggestions of which can be combined using the techniques disclosed herein.

In FIG. 1, at block 108, characteristics of topic suggestions can be adjusted. For example, when topic suggestions are scored, weights can be applied by a processor of a computing device performing part or all of method 100 to the scored topic suggestions in lists 312a and 312b. By the same token, since any number of topic sources 308a-308N can be used, scored topic suggestions generated by the respective topic sources can also be weighted. Thus, a particular weight can be assigned to each topic source. As illustrated by the techniques described below, some implementations of the disclosed methods are recursive, thus allowing each weight assigned to a given topic source to be optimized over a number of iterations.

In the example of FIG. 3, for purposes of illustration, a weight $w_1$ assigned to topic index 308b has been initialized at a value of 1.0. A second weight $w_2$ assigned to NLP library 308c has been initialized at a value of 0.5. The initial values of $w_1$ and $w_2$ can be adjusted as further described below. The weights assigned to the topic sources can be stored in an appropriate database, for instance, in a database table identifying each topic source in one column and the associated weight to be applied to each topic source in a second column.

In FIG. 1, at block 108, when a computing device such as a server retrieves the weight for a given topic source, such as $w_1$ for topic index 308b, one or more processors cooperating to perform method 100 can apply the retrieved weight to each scored topic suggestion from that source. Thus, $w_1$ is applied to the score of each topic suggestion in list 312a. In this example, each score for each topic suggestion in list 312a is multiplied by 1.0.

In FIG. 1, at block 112, when one or more scored topic suggestions in list 312b are received from NLP library 308c, in this example, the $w_2$ value of 0.5 is applied to the score of each topic suggestion in list 312b at block 116. Thus, in this example, the scores of 5, 7 and 4 of each topic suggested in list 312b are multiplied by 0.5.

Figure 4:
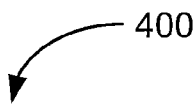
FIG. 4 shows an example of a presentation of a combined list 400 of topic suggestions in the form of a graphical user interface (GUI) as displayed on a computing device, in accordance with some implementations.

In FIG. 1, at block 120, the weighted scores of topic suggestions from any lists 312 from the various topic sources 308a-308N can then be combined at a summing unit 316 of FIG. 3 to generate a combined list of topic suggestions 400 illustrated in greater detail in FIG. 4. Thus, in the example of FIG. 3, the weighted scores of topic suggestions in list 312a using $w_1$ and the weighted scores of topic suggestions in list 312b using $w_2$ are added at summing unit 316, such that combined list 400 includes all of the topic suggestions appearing in lists 312*a* and 312*b* with combined weighted scores, as shown in FIG. 4.

In FIGS. 3 and 4, lists 312*a* and 312*b* include some different topic suggestions, that is, topics only appearing in one of the lists. However, in this example, the suggested topic "Mocha" appears in both lists 312*a* and 312*b*. Thus, since "Mocha" is common to both lists, the weighted score of mocha in list 312*a* is added to the weighted score of "Mocha" in list 312*b* at summing unit 316, so "Mocha" has a combined weighted score of 7, as shown in FIG. 4. Also, in the example of FIG. 4, the combined topic suggestions in list 400 are ranked according to combined weighted score, that is, with suggested topics having the highest score at the top of the list and suggested topics having the lowest score at the bottom of the list. The combined list 400 in FIG. 4 can then be displayed in a presentation in the form of a GUI displayed on a computing device operated by a user, at block 124 of FIG. 1. In some alternative implementations, only topics having a weighted score greater than a threshold, such as 5, are shown in a combined list. Thus, in such alternative implementations, only the topic suggestions of "Beverage", "Mocha" and "Dog" would be displayed in list 400.

Figure 5:
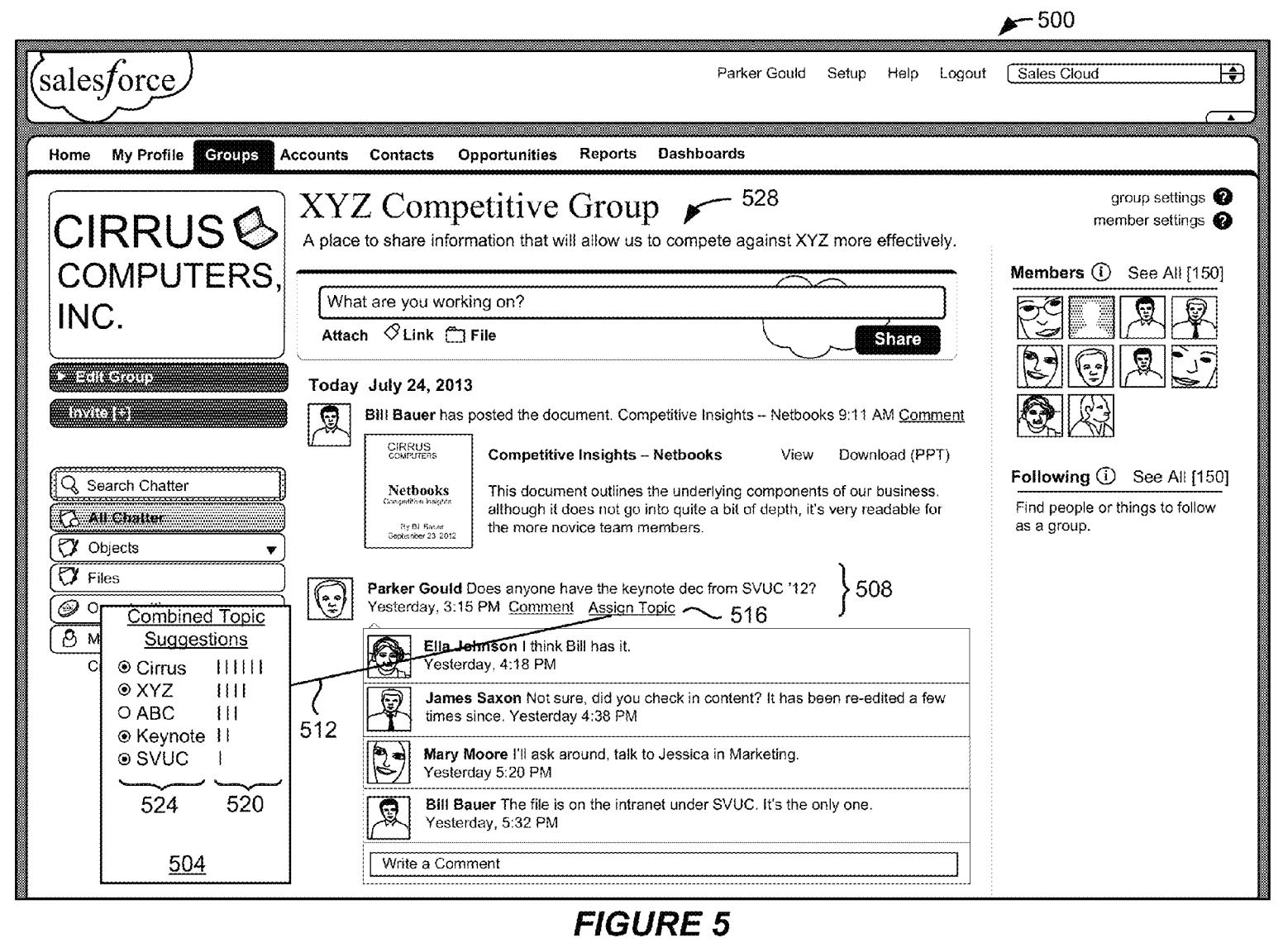

FIG. 5 shows an example of a presentation 500 of a group feed page in the form of a GUI as displayed on a user's computing device for assigning topics from a combined list to feed items of a group feed, in accordance with some implementations. In FIG. 5, a combined list of topic suggestions 504 has been generated for Parker Gould's post 508 using any number of topic sources 308*a*-308N of FIG. 3. That is, topics suggested by the various sources are combined with weighted scores as described above to generate list 504 with a graphical line 512 linking list 504 with post 508 as displayed in presentation 500. In some implementations, as shown in FIG. 5, a combined list of topic suggestions 504 can be generated in response to a user selecting an "assign topic" selection 516 displayed immediately following the textual content of a textual data item such as post 508. In some other implementations, combined lists of topic suggestions are generated by an automated process, that is, without any input from a user other than submitting a post or in response to other user input such as hovering a mouse pointer over a feed item. Combined weighted scores illustrated in the form of hash marks for the suggested topics in list 504 are provided in region 520 adjacent to the respective suggested topics in region 524.

Returning to FIG. 1, at block 128, a user can manually select any of the displayed topic suggestions in combined list 400 or combined list 504 to apply to the textual data item of interest. In the example of FIG. 5, a user has selected topics "Cirrus", "XYZ", "Keynote" and "SVUC" from list 504 to apply to post 508. Any such selections can be communicated at block 128 from the user's display device to a processor performing or cooperating to perform part or all of method 100.

In an alternative example, rather than displaying combined list 504 of FIG. 5 as part of presentation 500, a different window or pane on the user's computing device can be opened to display the contents of combined list 504. For example, returning to FIG. 4, combined list 400 can occupy a pane with little or no additional information displayed in the pane. In other examples, windows or panes can be selected or otherwise be presented to a user independent of any posts or other information updates presented in a feed. For instance, a window can be generated with selections allowing a user to manually identify any of the various types of textual data items disclosed herein, which can then be provided as inputs to any of various topic sources to generate combined lists of topic suggestions. A user can then be provided with control over selecting the textual data item or particular content of a textual data item as well as control over which weighted and scored topic suggestions in a combined list to assign to the particular data item or content.

In FIG. 5, combined list 504 is displayed in relation to a group feed 528 by virtue of being presented in a region adjacent to feed 528, in this example, a lower left region of presentation 500, as well as by virtue of line 512 connecting combined list 504 to post 508 in feed 528.

Figure 6:
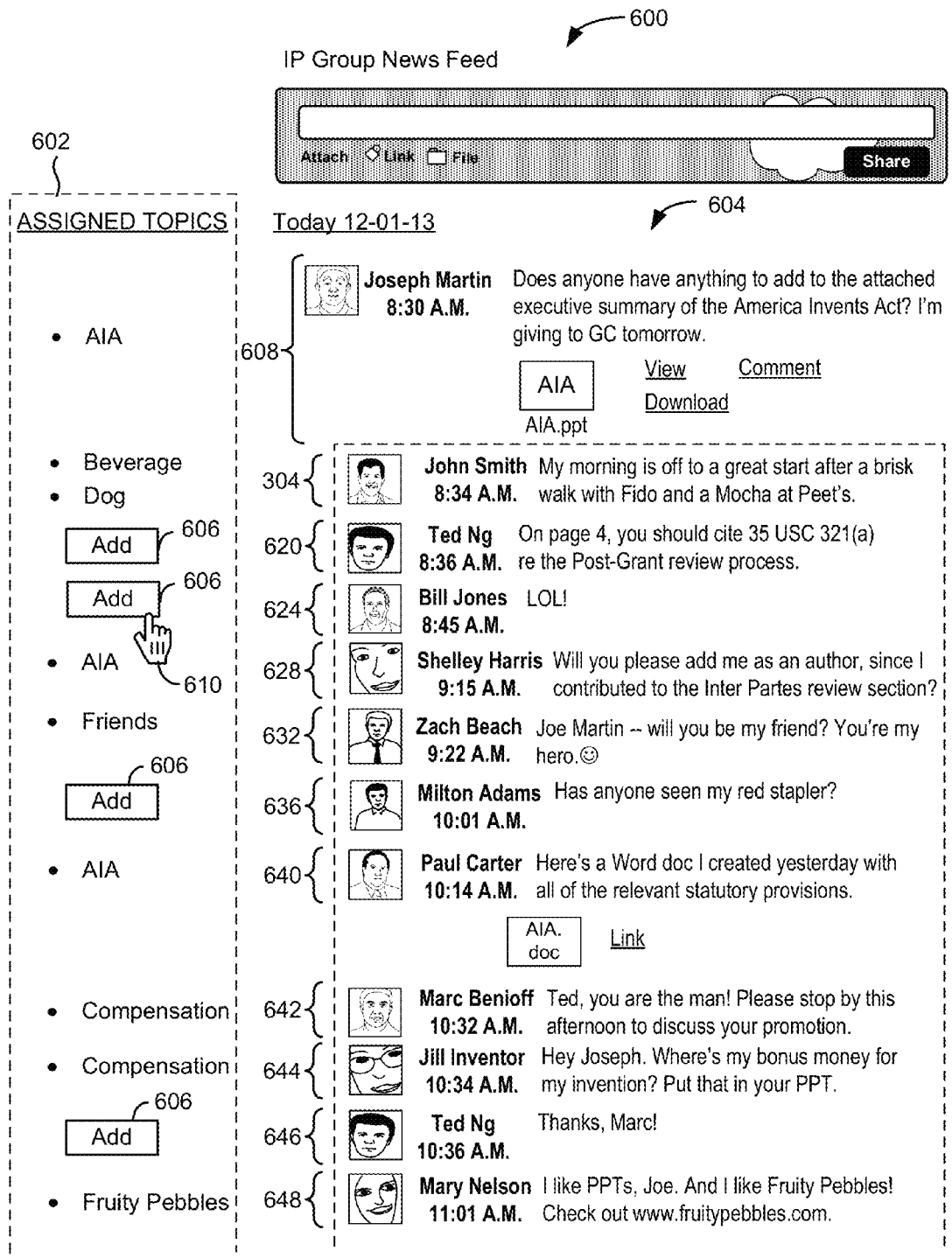
FIG. 6 shows another example of a presentation 600 of a group feed page in the form of a GUI as displayed on a user's computing device for assigning and monitoring topics associated with individual feed items, in accordance with some implementations.

FIG. 6 shows another example of a presentation 600 of a group feed page in the form of a GUI as displayed on a user's computing device for assigning and monitoring topics associated with individual feed items, in accordance with some implementations. In FIG. 6, a vertical scroll of topic assignments in a topics region 602 is displayed to the left of feed 604 including any number of posts, comments, record updates and other types of feed items in a vertical arrangement. Thus, in this example, suggested topics appearing in assigned topics region 602 are displayed in conjunction with respective feed items of feed 604 by being displayed immediately adjacent to respective feed items in presentation 600. A user has already selected and assigned the topic "AIA" to Joseph Martin's post 608. By the same token, a user has assigned the same topic to Shelley Harris's comment 628 and Paul Carter's comment 640. Other topics such as "compensation" have been assigned to comments 642 and 644.

In the example of FIG. 6, assigned topics region 602 includes "Add" buttons 606 appearing adjacent to feed items to which no topics are currently assigned. When a user uses an input device such as a mouse to control graphical pointer 610 and select one of Add buttons 606, the feed item adjacent to the selected Add button is provided as an input to topic sources 308*a*-308N of FIG. 3. Thus, in FIG. 6, selecting the Add button corresponding to a particular feed item can cause the content of the feed item to be processed by the various topic sources of FIG. 3, thus causing a combined list of weighted and scored topic suggestions to be generated for the selected feed item using the techniques described above. For example, in FIG. 6, John Smith's comment 304 has been processed to identify and select topics "Beverage" and "Dog" using the techniques described above.

Figure 7:
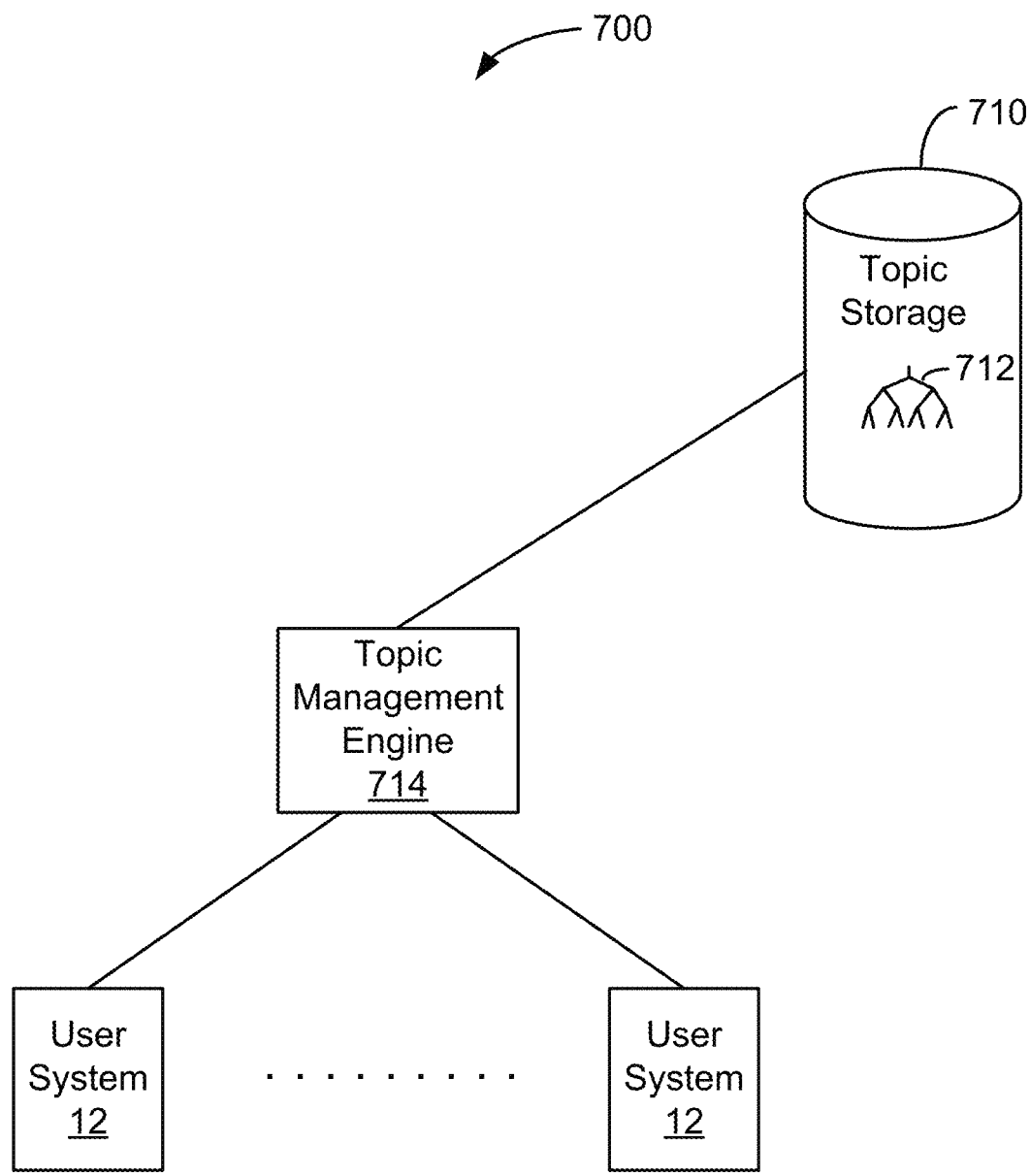
FIG. 7 shows an example of a system 700 including components for storing and managing topic suggestions and assignments, in accordance with some implementations.

FIG. 7 shows an example of a system 700 including components for storing and managing topic suggestions and assignments, in accordance with some implementations. System 700 includes topic storage 710, topic management engine 714, and user systems 12. Topic storage 710 and topic management engine 714 can be components of a database system, as described above with respect to FIGS. 1A and 1B. User systems 12 can interface with topic management engine 714, for example, via a network, also as described above with respect to FIGS. 1A and 1B. For example, as a user submits information updates such as posts, comments, indications of the user's personal preferences, updates to a user's status, updates to a record, uploaded files, and hyperlinks to social network data or other network data such as various documents and/or web pages on the Internet, the topic management engine can associate the information update with one or more topics in topic library 712 of topics. Topic library 712 of topics can be stored in topic storage 710 in any suitable data structure. In some implementations, topics can be stored in a hierarchical data structure, such as an ordered tree structure, e.g., a B-tree structure or a binary tree structure, and the like. The hierarchical data structure can include one or more top level categories, such as department, product, client, location, etc. each of which can have multiple levels of topics. In some implementations, topics may be stored in one or more database tables.

According to various implementations, library 712 can be a closed or open library. For example, in some implementations, a topic library 712 may include only a closed set of topics that may be associated with social network data. A closed topic library may be updated periodically, for example, by the system or an administrator. In some implementations, a user may submit any topic for inclusion in an open topic library 712, for example, by tagging a post with the topic. According to various implementations, a topic library 712 may be updated immediately on user submission or after review by a system administrator.

In some implementations, a user may associate a topic with an information update or other social network data, including information updates submitted by the user and/or other users. In some implementations, topic management engine 714 may automatically associate one or more topics with user-submitted information updates, e.g., by frequency or occurrence of keywords, phrases, symbols, etc. within a message, post, conversation thread, etc.

As shown in FIG. 7, any selected topic suggestions for a given feed item or other type of textual data item can be associated with the textual data item for later reference. In some instances, topic storage 710 is one database of a larger database system storing different types of textual data items to which topics can be assigned. In some other implementations, topic storage 710 stores topics as well as any textual data items to which the topics are assigned.

In some implementations, associations of topics with information updates and other social network data may be stored in one or more database tables. FIG. 8 shows an example of a topic table 800 that may be used for tracking information updates and topic associations in a social networking system, in accordance with some implementations. Topic table 800 can have columns of topic IDs 804 and associated information update IDs 808. In implementations in which a hierarchical topic structure is used, parent and/or child topics may be stored in topic table 800.

Fields in one or more databases can be updated to reflect processing and user input in accordance with the techniques disclosed herein. In FIG. 8, in fields of column 804, the values "T331", "T332", "T333", etc. identify particular topic suggestions identified by one or more topic sources. Thus, the topic IDs in column 804 can cross-reference a further database table storing the name of a given topic suggestion in relation to a topic ID uniquely identifying that topic. In topic table 800, column 808 identifies any information updates or other feed items stored in an appropriate feed table by ID, such that a given topic ID in a row of table 800 can identify one or more feed items to which the topic has been assigned. Thus, column 808 of table 800 includes fields identifying particular information updates associated with each topic identified in column 804. For instance, the IDs in column 808 can cross-reference a further database table storing the content of information updates indexed according to unique IDs using codes such as "P522", "C123" and so forth.

Figure 2:
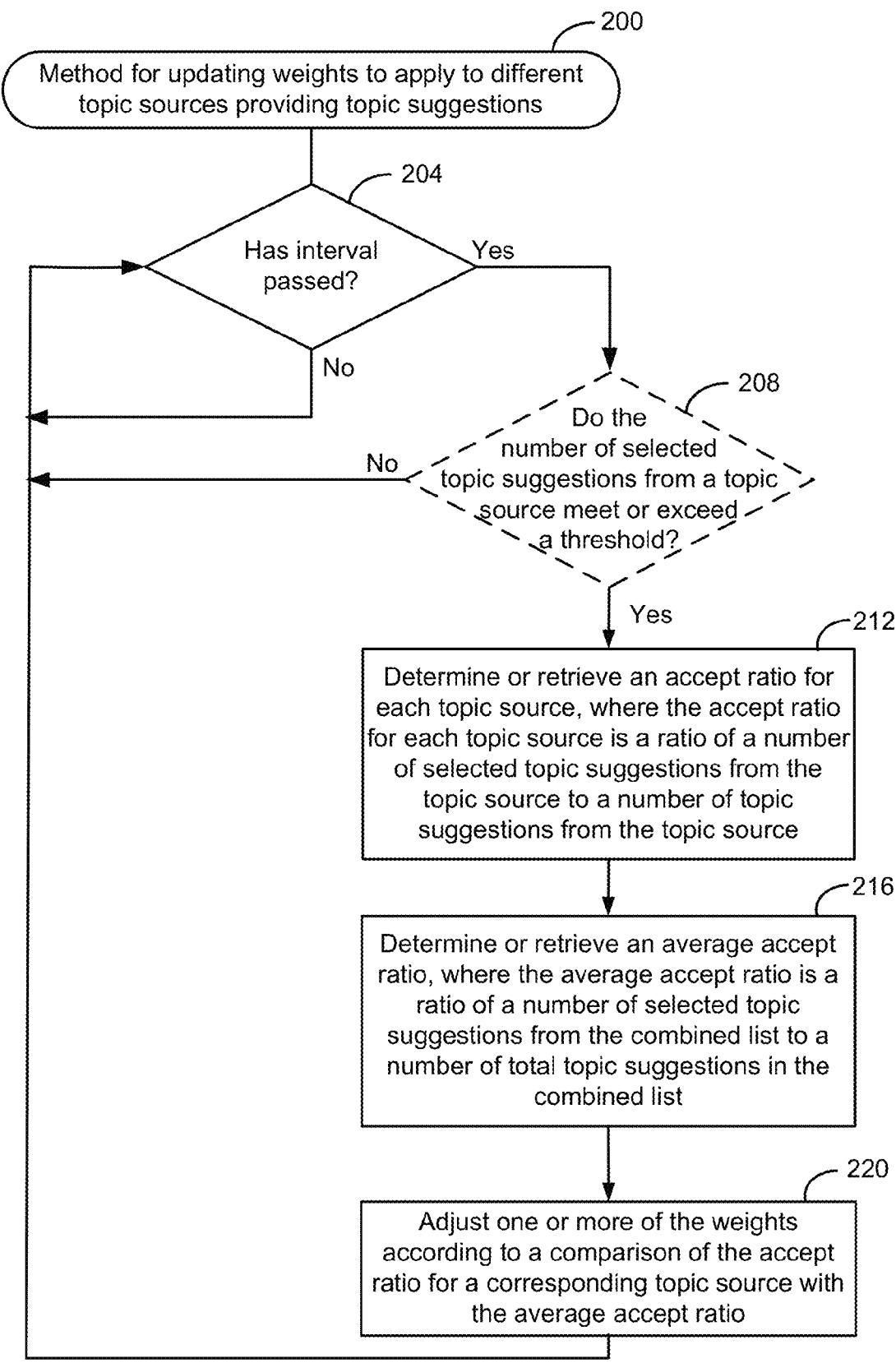
FIG. 2 shows a flowchart of an example of a computer implemented method 200 for updating weights to apply to different topic sources providing topic suggestions, performed in accordance with some implementations.

FIG. 2 shows a flowchart of an example of a computer implemented method 200 for updating weights to apply to different topic sources providing topic suggestions, performed in accordance with some implementations. FIG. 2 provides one example of a technique for impacting the ordering of topic suggestions in a combined list. In FIG. 2, weights associated with the various topic sources can be adjusted in response to the selection of suggested topics from a combined list. As described in greater detail below, in some implementations, a reference value can be determined using accept ratios in response to users' selections. In some implementations, these accept ratios include an average accept ratio calculated as the total number of selected topic suggestions from a combined list divided by the total number of topic suggestions appearing in the list. In some implementations, an accept ratio for each topic source can also be calculated. That is, the number of selected topic suggestions from a particular source can be divided by the total number of topic suggestions in the combined list from the particular source to calculate an accept ratio for that source. Both the average accept ratio and the accept ratio for a given topic source can each serve as a reference value to be used to adjust the weight applied to that source.

In some implementations, weights are adjusted using average accept ratios and accept ratios for each topic source over specified intervals, such as hourly, daily, weekly, monthly, etc. That is, at the end of a specified interval, weights associated with the various topic sources can be updated. Often, the updating of a weight is proportional to the corresponding topic source's accept rate during the last interval. Thus, a weight can be incremented for a given topic source when the accept ratio for that topic source is above the average accept ratio and decremented when the accept ratio for that topic source is below the average accept ratio. Applying the techniques herein, weights for the various topic sources can converge towards optimal values over successive intervals.

In FIG. 2, at block 204, it is determined whether an interval has passed. That is, if the hourly, daily, weekly, monthly, yearly, etc. interval as specified for the particular implementation has not passed, block 204 is repeated. When the interval has passed, the method proceeds to block 208 or block 212 in implementations where block 208 has been omitted, as described in greater detail below.

Over a given interval, all of the suggested topics appearing in lists from each topic source as well as in combined lists of topic suggestions are monitored in addition to monitoring the particular topic sources responsible for generating each topic suggestion. In addition, each time a user selects a particular topic to assign to a post or other textual data item, the selection is recorded. In some instances, as in the example where the term "Mocha" was suggested by more than one topic source, for purposes of calculating an accept ratio for a given topic source, the selection of "Mocha" is tracked as coming from only the source which gave the highest weighted score to the suggestion. Thus, in the examples of FIGS. 3 and 4 above, the selection of "Mocha" from combined list 400 is treated as coming from only topic index 308b since the weighted score of $w_1$ (1.0)×5 is greater than $w_2$ (0.5)×4, the weighted score from NLP library 308c. Thus, in these implementations, for simplification it is assumed that a selected topic suggestion comes from one topic source even though that topic may have been suggested by additional topic sources.

In some other implementations, the selection of a particular topic suggested by more than one topic source is treated as at least a partial success for each such topic source. Thus, in such implementations, each topic source can be credited in terms of calculating an accept ratio for that topic source, for example, using a percentage of the total combined weighted score attributable to that topic source. Thus, returning to the example of the topic "Mocha" suggested by both topic index 308b and NLP library 308c of FIG. 3, both topic sources 308b and 308c can be provided partial credit.

In FIG. 2, in block 208, in some implementations, when an interval has passed at block 204, it can be determined whether the number of selected topic suggestions from a topic source meets or exceeds a specified threshold. That is, in some implementations, when the number of selected topic suggestions from a combined list for a particular topic source is lower than a certain threshold, it can be desirable to not update that topic source's accept ratio in light of the likelihood that the data pool is too small and would introduce error into the adjustment. When the threshold is not traversed, at block 208, the method returns to block 204 to wait for passage of the next interval. When the threshold is traversed, the method proceeds to block 212, where the accept ratio for a particular topic source is determined or retrieved.

In FIG. 2, at block 212, it should be understood that, in some implementations, the accept ratio for a particular topic source can be computed and updated over the course of an interval as each topic suggestion is selected. In such cases, the accept ratio can be maintained in an appropriate database table and retrieved at block 212. In some other implementations, the data used to calculate an accept ratio for a given topic source is maintained, but the accept ratio for the topic source is not computed until block 212 is reached. Thus, at block 212, a number of selected topic suggestions from a combined list attributable to a particular topic source over the course of an interval can be retrieved, as can the total number of topic suggestions from the topic source over the interval. A ratio of the number of selected topic suggestions from the source to the total topic suggestions from the source can then be calculated at block 212. The accept ratio for a given topic source can thus provide a reference value representing how frequently users accepted suggested topics from the topic source over the interval. For purposes of illustration, let the accept ratio for a source, s, be $r_s = A_s/S_s$ where $A_s$ is the number of selected topic suggestions from that source and $S_s$ is the number of presented topic suggestions in the combined list from that source.

In some implementations in which more than one organization is being serviced by a multi-tenant database system, the weights assigned to various topic sources, the accept ratio for each topic source, and the average accept ratio can be specific to each organization. Thus, for example, only the selection of topic suggestions by an individual's co-workers over the course of an interval can be used to adjust weights for the organization to which those workers belong. In some other implementations, as an alternative to monitoring selections of topic suggestions and adjusting weights for a particular organization, the determinations can be made on a system-wide basis or, in some implementations, on a per-user basis.

In FIG. 2, after block 212, method 200 proceeds to block 216, at which the average accept ratio over the interval is determined or retrieved. As mentioned above, the average accept ratio can be calculated by dividing the total number of selected topic suggestions from the combined list by the total number of topic suggestions appearing in the combined list over the course of the interval. In the equation below, "R" represents the average accept ratio and is determined irrespective of topic source.

At block 220, when weights assigned to respective topic sources are maintained on a database or other storage medium, these weights can be adjusted. In some implementations, the accept ratio for a particular topic source can be compared with the average accept ratio to govern how much to change a weight. Generally, the updated value of a weight can be computed as a function of the accept ratio for a topic source associated with the weight, the average accept ratio, and the previous value of the weight. In general, the new value of the weight will be increased when the accept ratio for the particular topic source in the preceding interval was above the average accept ratio. By the same token, the weight will be decreased for sources having a below-average accept ratio.

In some implementations, adjusting a weight associated with a given topic source includes increasing or decreasing a previous value of the weight proportionally with respect to a control ratio, which is one example of a reference value for impacting the ordering of topic suggestions in a combined list. This control ratio, in some implementations, is the ratio of the accept ratio for the topic source to the average accept ratio: $r_s/R$. In some implementations, the updated value of a weight for the next interval (n) can be determined using data from the previous interval (n−1) according to the following equation:

$$w_{sn} = w_{sn-1} * (r_{sn-1}/R_{n-1})^c$$

In the equation above, "s" refers to the identity of a particular topic source. The control ratio in the above equation will be >1 for above average accept ratios and <1 for below average accept ratios for a given topic source. Thus, in general, the updated or new value of the weight associated with a topic source is increased when the control ratio is greater than one, and the weight is decreased when the control ratio is less than one. That is, in this example, the control ratio or some exponential function of the control ratio can be multiplied by the previous value of the weight to determine a reference value in the form of the new value of the weight.

In some implementations, an exponential factor represented by the variable "c" in the equation above is applied to the control ratio (r/R) to govern a rate of adjustment of the weight. That is, the "c" value generally controls the rate of change of the weight over successive intervals. In some implementations, "c" is set depending on the length of the interval for the particular implementation. For example, when an interval is short, such as daily, "c" can be set at a relatively smaller value<1, such as 0.5, because the weight will be updated on a daily basis. In other implementations, when the interval is relatively longer, such as weekly, monthly, quarterly, etc., "c" can be set at a relatively larger value greater than 1, such as c=2. The value of "c" can be changed manually or automatically in response to a delta in the weight from the new value to the old value.

In the equation above, the accept ratio for a given topic source as well as the average accept ratio can be determined for each interval, such as every week, month, quarter, year, etc. Thus, data identifying suggested topics form the various topic sources as well as identifying topics included in a combined list that are selected by a user to apply to a textual data item can be gathered. At the end of each interval, accept ratios for each topic source can be calculated for the purpose of incrementing or decrementing weights associated with the respective topic sources according to the control ratio, which can be aggressively or conservatively altered using the exponential factor "c". Thus, in general, topic sources that prove to be successful at suggesting topics over successive intervals have their weights increased, while topic sources performing poorly have their weights reduced.

As mentioned above, in some implementations, a threshold can be implemented to determine whether a sufficient amount of data has been gathered before permitting a weight to be adjusted. For example, a threshold can be implemented to determine that a certain minimum number of selections of topic suggestions in a combined list are made within a given interval before the weight for a corresponding topic source is adjusted. In such instances, it may be desirable to prevent updating the weight associated with a topic source when only a few, i.e., insufficient data points indicating selected topic suggestions from the topic source have been gathered during an interval. In some instances, when insufficient data is gathered over one or more intervals, the length of the interval can be changed, for instance, from weekly to monthly, so sufficient data is gathered for future computations and any adjustments of weights.

In FIG. 2, following block 220, method 200 returns to block 204 to determine any adjustments to weights for the next interval, thus providing a recursive flow in this example.

Those skilled in the art should appreciate that as the weight assigned to a given topic source is increased relative to weights assigned to other sources, more topic suggestions from the given topic source will appear in a combined list, such as list 400 of FIG. 4. That is, topic suggestions from the source that may have had a relatively low raw score can be weighted with such significance that the lower-scored suggestions are ranked higher in the combined list when merged with suggestions from other topic sources. Because these lower-scored topic suggestions are of lower likelihood of being relevant to a particular textual data item, over time, the inclusion of the lower-scored suggestions in the combined list will result in the accept ratio for the topic source decreasing over successive intervals towards the average accept ratio. Thus, over time, the disclosed techniques can ensure that the weights are adjusted to converge toward optimal values where all of the included topic sources have desirable accept ratios.

In some instances, such as a situation where too small of an amount of data has been gathered over an interval, it can be desirable to not update the weights using the techniques described above. In some instances, when weights are allowed to be adjusted, for instance, over successive intervals when no suggested topics from the topic source have been selected, the weight associated with the topic source could be reduced to a value of zero. When a weight reaches zero, the weight can be automatically reset to a default higher value to allow the topic source to again be considered as one of any number of topic sources to have an opportunity to provide helpful suggestions in the future.

A threshold minimum number of selected topic suggestions over an interval as a preliminary condition to adjusting the weight for a topic source can prevent the scenario of the weight reaching a value of zero. For example, if a threshold is set at 10, if less than 10 topic suggestions from a particular topic source are selected over the course of an interval, the previous value of the weight assigned to the topic source is maintained; that is, the weight is not permitted to be adjusted upwards or downwards. In some other implementations, the weight can be updated such that the magnitude of the increment or decrement is generally proportional to the number of selected suggestions. Thus, in such implementations, the new value of a weight can be a function of not only the accept ratio for the particular source, the average accept ratio, and the previous value of the weight, but also a function of the amount of data confirming selections of suggested topics for the topic source.

In some implementations, when a weight associated with a topic source reaches zero or falls below a certain value, additional or alternative techniques can be implemented to raise the value of the weight to prevent the topic source from being essentially negated. For example, even when no or very few suggested topics were selected during the last interval, the weight for the topic source can be incremented slightly during the weight updating stage, contrary to the general techniques discussed above with reference to FIG. 2. In another example, a random element can be provided to introduce one or more topic suggestions from a topic source even when the weighted score of the suggestion would cause the suggestion to be omitted from a combined list of topic suggestions from various sources. In another example, sources having a weight that reaches zero or falls below a threshold can be treated as a new topic source and essentially re-introduced to the system by resetting the weight to an initial or default value. In this example, resetting the weight can be helpful in situations where a bug in one of the topic sources makes that source perform poorly. Resetting the weight to a default value essentially intervenes in the techniques described above with respect to FIG. 2 to prevent the scenario where no topic suggestions from a source are included in a combined list because the weight for the topic source is so small. By re-initializing the weight for the topic source, topic suggestions from that source can again be included for future intervals.

Systems, apparatus, and methods are described below for implementing database systems and enterprise level social and business information networking in conjunction with the disclosed techniques. Such implementations can provide more efficient use of a database system. For instance, a user of a database system may not easily know when important information in the database has changed, e.g., about a project or client. Such implementations can provide feed tracked updates about such changes and other events, thereby keeping users informed.

By way of example, a user can update a record in the form of a CRM object, e.g., an opportunity such as a possible sale of 1000 computers. Once the record update has been made, a feed tracked update about the record update can then automatically be provided, e.g., in a feed, to anyone subscribing to the opportunity or to the user. Thus, the user does not need to contact a manager regarding the change in the opportunity, since the feed tracked update about the update is sent via a feed to the manager's feed page or other page.

Figure 9A:
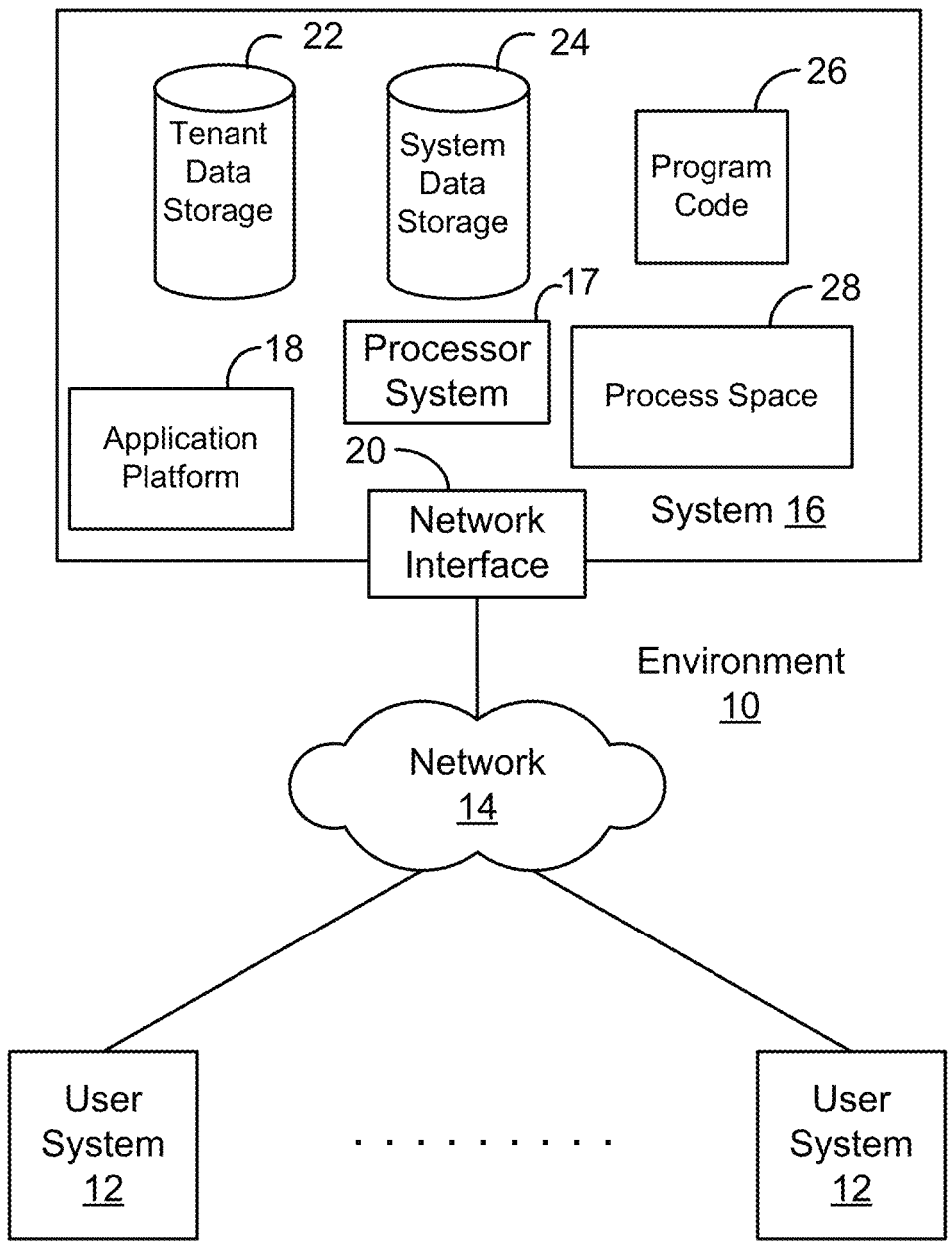
FIG. 9A shows a block diagram of an example of an environment 10 in which an on-demand database service can be used in accordance with some implementations.

FIG. 9A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 9A (and in more detail in FIG. 9B) user systems 12 might interact via a network 14 with an on-demand database service, which is implemented in the example of FIG. 9A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 9A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 9B:
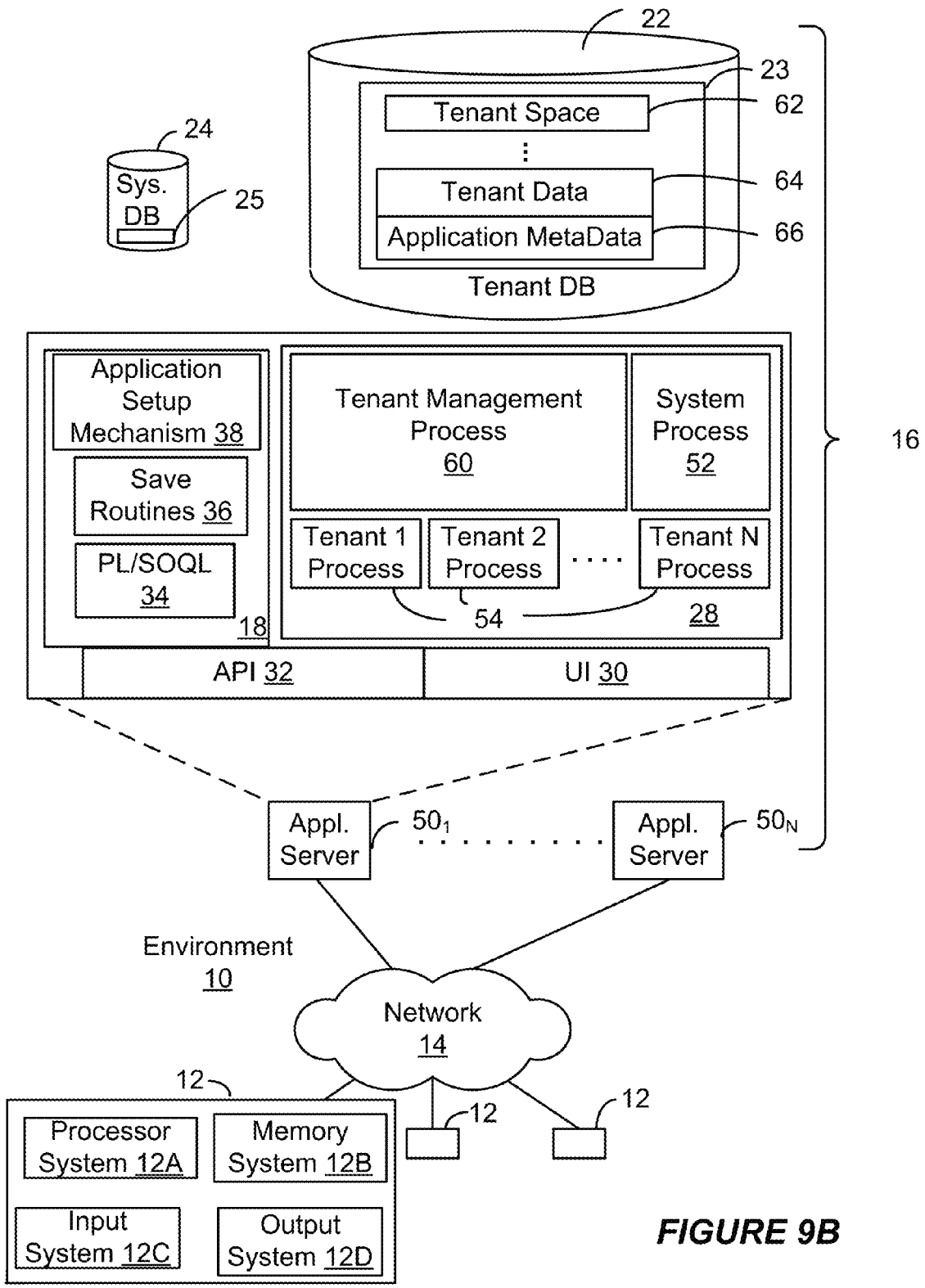
FIG. 9B shows a block diagram of an example of some implementations of elements of FIG. 9A and various possible interconnections between these elements.

One arrangement for elements of system 16 is shown in FIGS. 9A and 9B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 9A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s)

including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 9B shows a block diagram of an example of some implementations of elements of FIG. 9A and various possible interconnections between these elements. That is, FIG. 9B also illustrates environment 10. However, in FIG. 9B elements of system 16 and various interconnections in some implementations are further illustrated. FIG. 9B shows that user system 12 may include processor system 12A, memory system 12B, input system 12C, and output system 12D. FIG. 9B shows network 14 and system 16. FIG. 9B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 9A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 9B, system 16 may include a network interface 20 (of FIG. 9A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 10A:
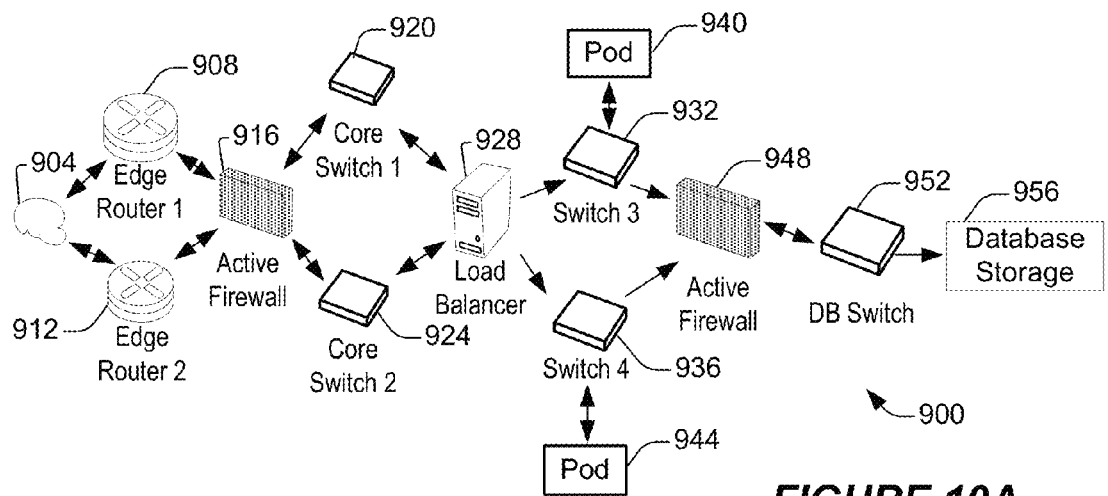
FIG. 10A shows a system diagram of an example of architectural components of an on-demand database service environment 900, in accordance with some implementations.

FIG. 10A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

Figure 10B:
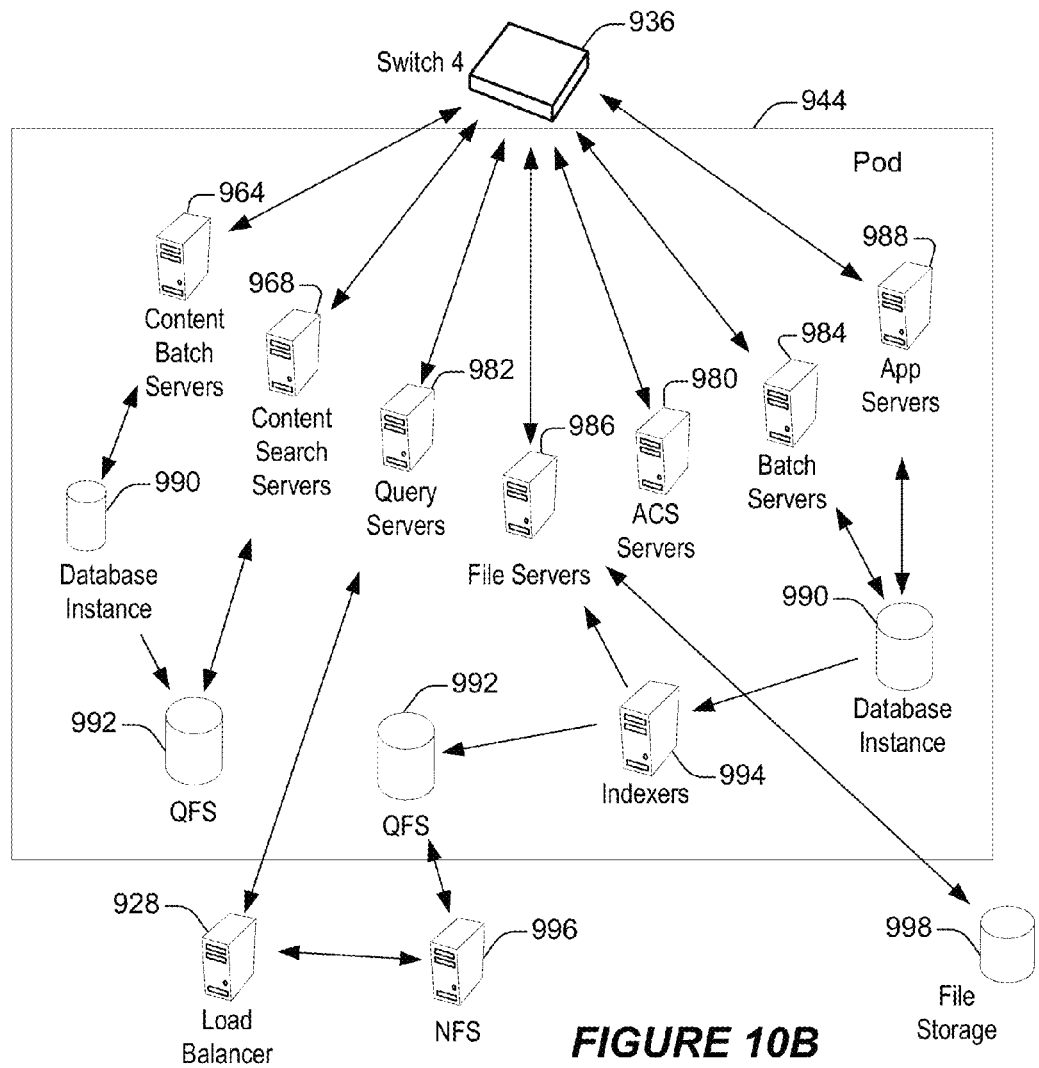
FIG. 10B shows a system diagram further illustrating an example of architectural components of an on-demand database service environment, in accordance with some implementations.

As shown in FIGS. 10A and 10B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 10A and 10B, some implementations of an on-demand database service environment may include anywhere from one to many devices of each type. Also, the on-demand database service environment need not include each device shown in FIGS. 10A and 10B, or may include additional devices not shown in FIGS. 10A and 10B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 10B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 9A and 9B.

FIG. 10B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

In some implementations, the app servers 988 may include a hardware and/or software framework dedicated to the execution of procedures (e.g., programs, routines, scripts) for supporting the construction of applications provided by the on-demand database service environment 900 via the pod 944. In some implementations, the hardware and/or software framework of an app server 988 is configured to execute operations of the services described herein, including performance of one or more of the blocks of methods described herein with reference to FIGS. 1-8. In alternative implementations, two or more app servers 988 may be included to perform such methods, or one or more other servers described herein can be configured to perform part or all of the disclosed methods.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, Calif. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory ("ROM") devices and random access memory ("RAM") devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A computer implemented method for combining topic suggestions from different topic sources to assign to textual data items, the method comprising:
   receiving, from a first automated topic source, one or more first topic suggestions to associate with a textual data item, each first topic suggestion having a respective first characteristic;
   adjusting, by a processor of a computing device, the first characteristic of each first topic suggestion, comprising: applying a first weight to each first topic suggestion;
   receiving, from a second automated topic source, one or more second topic suggestions to associate with the textual data item, each second topic suggestion having a respective second characteristic;
   adjusting the second characteristic of each second topic suggestion, comprising:
      applying a second weight to each second topic suggestion;
   combining the first and second topic suggestions to define a combined list of topic suggestions;
   providing the combined list of topic suggestions suitable for a display device capable of displaying the combined list in a user interface;
   receiving, at the processor from the display device, a selection of one or more of the topic suggestions from the combined list to assign to the textual data item; and
   determining or retrieving a reference value to impact ordering of the topic suggestions in the combined list.

2. The method of claim 1, wherein the first characteristic is a first score, and the second characteristic is a second score.

3. The method of claim 2, wherein:
   the first and second weights are stored on a storage medium in communication with the processor.

4. The method of claim 3, wherein the topic suggestions in the combined list are ordered according to weighted score.

5. The method of claim 3, wherein the one or more first topic suggestions and the one or more second topic suggestions both include a common topic suggestion, and combining the first and second topic suggestions includes summing the respective weighted scores for the common topic suggestion.

6. The method of claim 3, wherein the reference value is determined or retrieved by:
   determining or retrieving an average accept ratio, the average accept ratio being a ratio of a number of selected topic suggestions from the combined list to a number of total topic suggestions in the combined list;
   determining or retrieving an accept ratio for each topic source, the accept ratio being a ratio of a number of selected topic suggestions from the topic source to a number of topic suggestions from the topic source; and
   adjusting one or more of the weights stored on the storage medium according to a comparison of the accept ratio for a corresponding topic source with the average accept ratio.

7. The method of claim 6, wherein adjusting a weight includes increasing or decreasing a previous value of the weight proportionally with respect to a control ratio of the accept ratio for the corresponding topic source to the average accept ratio.

8. The method of claim 7, wherein the weight is increased when the control ratio is greater than one, and the weight is decreased when the control ratio is less than one.

9. The method of claim 7, wherein the weight is adjusted from the previous value to a current value by applying the control ratio to the previous value.

10. The method of claim 7, wherein an exponential factor is applied to the control ratio, the exponential factor governing a rate of the adjustment of the weight.

11. The method of claim 6, wherein the average accept ratio and the accept ratio for each topic source are determined, and the one or more weights are adjusted, over a designated interval.

12. The method of claim 6, wherein adjusting a weight includes increasing or decreasing a previous value of the weight proportionally with respect to the number of selected topic suggestions from the corresponding topic source.

13. The method of claim 6, wherein adjusting a weight includes resetting the weight to a default value.

14. The method of claim 1, further comprising:
   determining that the number of selected topic suggestions from the topic source meets or exceeds a threshold.

15. The method of claim 1, wherein:
   each topic source is one of: a topic index, a natural language processing (NLP) library, a consecutive words identifier, a noun phrase extractor, and a use-based word identifier, and
   the textual data item includes textual content and is one of: a social networking message, a database record, a feed-based record update, a document, a knowledge article, a scientific paper, a book, a web page, an online encyclopedia entry, a database record, a customer relationship management (CRM) object, a user profile, a group file, an email message, an instant message, and a text message.

16. The method of claim 1, further comprising:
   associating the selected one or more topic suggestions with the textual data item, including updating a field in a database system storing the textual data item to indicate the association.

17. The method of claim 16, wherein the textual data item is an information update, and the selected one or more topic suggestions are capable of being displayed in the user interface in conjunction with a social network feed including the information update.

18. The method of claim 1, wherein the display device is one of: a smartphone, a laptop, a tablet, a wearable display device, a desktop computer, and a monitor.

19. One or more computing devices for combining topic suggestions from different topic sources to assign to textual data items, the one or more computing devices comprising:
   one or more processors operable to execute one or more instructions to:
      receive, from a first automated topic source, one or more first topic suggestions to associate with a textual data item, each first topic suggestion having a respective first characteristic,
      adjust the first characteristic of each first topic suggestion, comprising:
         applying a first weight to each first topic suggestion,
      receive, from a second automated topic source, one or more second topic suggestions to associate with the textual data item, each second topic suggestion having a respective second characteristic,
      adjust the second characteristic of each second topic suggestion, comprising:
         applying a second weight to each second topic suggestion,
      combine the first and second topic suggestions to define a combined list of topic suggestions, and determine or retrieve a reference value to impact ordering of the topic suggestions in the combined list.

20. A non-transitory computer-readable storage medium storing instructions executable by a processor to cause a method to be performed for combining topic suggestions from different topic sources to assign to textual data items, the method comprising:

receiving, from a first automated topic source, one or more first topic suggestions to associate with a textual data item, each first topic suggestion having a respective first characteristic;

adjusting the first characteristic of each first topic suggestion, comprising:

applying a first weight to each first topic suggestion;

receiving, from a second automated topic source, one or more second topic suggestions to associate with the textual data item, each second topic suggestion having a respective second characteristic;

adjusting the second characteristic of each second topic suggestion, comprising:

applying a second weight to each second topic suggestion;

combining the first and second topic suggestions to define a combined list of topic suggestions; and determining or retrieving a reference value to impact ordering of the topic suggestions in the combined list.

* * * * *